(12) United States Patent
Bargmann et al.

(10) Patent No.: US 11,886,685 B1
(45) Date of Patent: Jan. 30, 2024

(54) DESKTOP CONTAINER PEEK INTERFACE

(71) Applicant: Stardock Corporation, Plymouth, MI (US)

(72) Inventors: Jeff Bargmann, San Francisco, CA (US); Brad Wardell, Plymouth, MI (US); Sean Drohan, Plymouth, MI (US)

(73) Assignee: STARDOCK CORPORATION, Plymouth, MI (US)

( * ) Notice: Subject to any disclaimer, the term of this patent is extended or adjusted under 35 U.S.C. 154(b) by 0 days.

(21) Appl. No.: 17/970,039

(22) Filed: Oct. 20, 2022

(51) Int. Cl.
*G06F 3/04817* (2022.01)
*G06F 9/451* (2018.01)
*G06F 3/023* (2006.01)

(52) U.S. Cl.
CPC ........ *G06F 3/04817* (2013.01); *G06F 3/0238* (2013.01); *G06F 9/451* (2018.02)

(58) Field of Classification Search
CPC ..... G06F 9/451; G06F 3/0238; G06F 3/04817
See application file for complete search history.

(56) References Cited

U.S. PATENT DOCUMENTS

| | | | |
|---|---|---|---|
| 5,574,934 A | 11/1996 | Mirashrafi et al. | |
| 5,644,737 A | 7/1997 | Tuniman et al. | |
| 5,764,215 A | 6/1998 | Brown et al. | |
| 6,160,551 A | 12/2000 | Naughton et al. | |
| 6,469,714 B2 | 10/2002 | Buxton et al. | |
| 6,473,103 B1 | 10/2002 | Bailey et al. | |
| 6,993,727 B2 | 1/2006 | De Ceulaer et al. | |
| 7,061,498 B2 | 6/2006 | Vollschwitz | |
| 7,603,628 B2 | 10/2009 | Park | |
| 7,681,143 B2 | 3/2010 | Lindsay | |
| 7,817,163 B2 | 10/2010 | Hanggie et al. | |
| 8,732,607 B1 | 5/2014 | Grechishkin et al. | |
| 8,972,879 B2 | 3/2015 | Migos et al. | |
| 9,037,997 B2 | 5/2015 | Ording | |

(Continued)

FOREIGN PATENT DOCUMENTS

KR 2006-0105422 10/2006

OTHER PUBLICATIONS

Baudisch et al., "Multiblending: displaying overlapping windows simultaneously without the drawbacks of alpha blending", 8 pages. Apr. 24, 2004.

(Continued)

*Primary Examiner* — Mong-Shune Chung
(74) *Attorney, Agent, or Firm* — NIXON PEABODY LLP

(57) ABSTRACT

Systems and methods for managing desktop environments of computer operating systems (OSs) are disclosed. A desktop of a graphical user interface (GUI) can be presented at a desktop layer of a window stack. Container(s) (e.g., desktop window(s)) that include one or more icons can be implemented as fenced off regions of the desktop, allowing users to interact with the containers and icons within while viewing the desktop. When the desktop is covered by other windows in the window stack, a depressed hotkey combination can cause the container(s) to pop above the other visible windows, allowing the user to interact with the containers and icons without needing to minimize, close, or move the other visible windows. Releasing the hotkey combination permits the container(s) to move back down to their original position in the window stack.

26 Claims, 8 Drawing Sheets

(56) References Cited

U.S. PATENT DOCUMENTS

| | | | |
|---|---|---|---|
| 9,733,954 | B2 | 8/2017 | Schechter et al. |
| 9,760,234 | B2 | 9/2017 | Karstens |
| 9,836,313 | B2 | 12/2017 | Wigdor et al. |
| 10,152,202 | B2 | 12/2018 | Zhang et al. |
| 10,572,109 | B2 | 2/2020 | Penha et al. |
| 10,671,414 | B2 | 6/2020 | Beaumont |
| 10,732,719 | B2 | 8/2020 | Mese et al. |
| 2005/0125736 | A1 | 6/2005 | Ferri et al. |
| 2007/0022389 | A1* | 1/2007 | Ording ............... G06F 3/04847 715/790 |
| 2008/0307350 | A1 | 12/2008 | Sabatelli et al. |
| 2010/0095248 | A1* | 4/2010 | Karstens ............ G06F 3/04847 715/846 |
| 2011/0145758 | A1 | 6/2011 | Rosales et al. |
| 2011/0202857 | A1* | 8/2011 | Coenen ................. G06F 9/451 715/765 |
| 2013/0285948 | A1* | 10/2013 | Zhang .................. G06F 3/0486 345/173 |
| 2014/0164991 | A1 | 6/2014 | Kim et al. |
| 2015/0128085 | A1* | 5/2015 | Peng ..................... G06F 3/0481 715/777 |
| 2015/0193096 | A1 | 7/2015 | Lee et al. |
| 2016/0224211 | A1 | 8/2016 | Xu et al. |

OTHER PUBLICATIONS

Oliver et al., "RelAltTab: Assisting Users in Switching Windows", ResearchGate, Conference Paper, Jan. 2008, 5 pages.

Tashman et al., "WindowScape: A Task Oriented Window Manager", ACM, 2006, 4 pages.

"Understanding and Supporting Window Switching", A thesis submitted in partial fulfilment of the requirements for the Degree of Doctor of Philosophy in the University of Canterbury by Susanne Tak, 212 pages. 2011.

Xu et al., "Push-and-Pull Switching: Window Switching based on Window Overlapping", CHI 2010: Interaction Techniques, Apr. 10-15, 2010, Atlanta, GA, USA, pp. 1335-1338.

* cited by examiner

DESKTOP CONTAINER PEEK INTERFACE

TECHNICAL FIELD

The present disclosure relates to computing devices generally and more specifically to improvements in graphical user interfaces.

BACKGROUND

Many modern computing operating systems (OSs) provide graphical user interfaces (GUIs) to help users interact with the programs running on the computer system. In some cases, the functionality provided by these graphical user interfaces dictates what a user is able to do in a system, what sort of content a user can create, and how easily the user is able to perform tasks. As such, there is an important need for innovative, intuitive, and functional graphical user interfaces.

One of the most common types of OS GUI is a desktop environment, which can provide easy and intuitive ways for a user to interact with the computer system. For example, in most Microsoft® Windows® environments, Windows Shell provides the desktop environment. Desktop environments are based on a windowing system, which can manage a number of windows for presentation to a user. Each windows can be visible or invisible, and can contain various content, such as icons, widgets, menus, graphical displays, interfaces, and the like. Windows are arranged in a window stack by Z-order. Windows with a higher Z-order are placed "above" windows with a lower Z-order, such that the higher Z-order window may be visible over the lower Z-order window. In other words, when the windowing system attempts to paint the window stack, higher Z-order windows that overlap lower Z-order windows can affect (e.g., entirely block, apply transparency effects to, or otherwise modify) how those lower Z-order window(s) are displayed.

In a desktop environment, the bottommost visible layer is often known as the desktop layer. This desktop layer may include one or more windows, such as a window containing icons that appear on the GUI's desktop (e.g., a Trash icon or a My Computer icon). While the desktop layer is an easy-to-use location for organizing files and programs, it becomes covered by other windows due to its nature. Thus, one desiring to access items on the desktop often must minimize, close, or move other windows before such access can be provided, which can disrupt a user's workflow and otherwise be problematic and cumbersome.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, supplemented by this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a method comprising presenting a desktop on an operating system. The desktop includes one or more desktop windows. The desktop is presented at a desktop layer of a window stack. The desktop includes a container set of one or more containers. Each container of the container set containing at least one icon. The method further includes presenting a working window (e.g., a WorkerW-class window), the working window having a higher z-order than the desktop layer. The method further includes receiving an engagement signal to engage a peek functionality. The method further includes moving the container set within the window stack set to present the container set above the working window in the window stack in response to engagement of the peek functionality. The method further includes receiving an interaction with the at least one icon while the container set is presented above the working window in the window stack. The method further includes receiving a disengagement signal. The method further includes reverting the container set to the desktop layer of the window stack in response to receiving the disengagement signal.

Embodiments of the present disclosure include a system comprising one or more data processors and a non-transitory computer-readable storage medium containing instructions which, when executed on the one or more data processors, cause the one or more data processors to perform operations. The operations include presenting a desktop on an operating system. The desktop includes one or more desktop windows. The desktop is presented at a desktop layer of a window stack. The desktop includes a container set of one or more containers. Each container of the container set containing at least one icon. The operations further include presenting a working window (e.g., a WorkerW-class window), the working window having a higher z-order than the desktop layer. The operations further include receiving an engagement signal to engage a peek functionality. The operations further include moving the container set within the window stack set to present the container set above the working window in the window stack in response to engagement of the peek functionality. The operations further include receiving an interaction with the at least one icon while the container set is presented above the working window in the window stack. The operations further include receiving a disengagement signal. The operations further include reverting the container set to the desktop layer of the window stack in response to receiving the disengagement signal.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
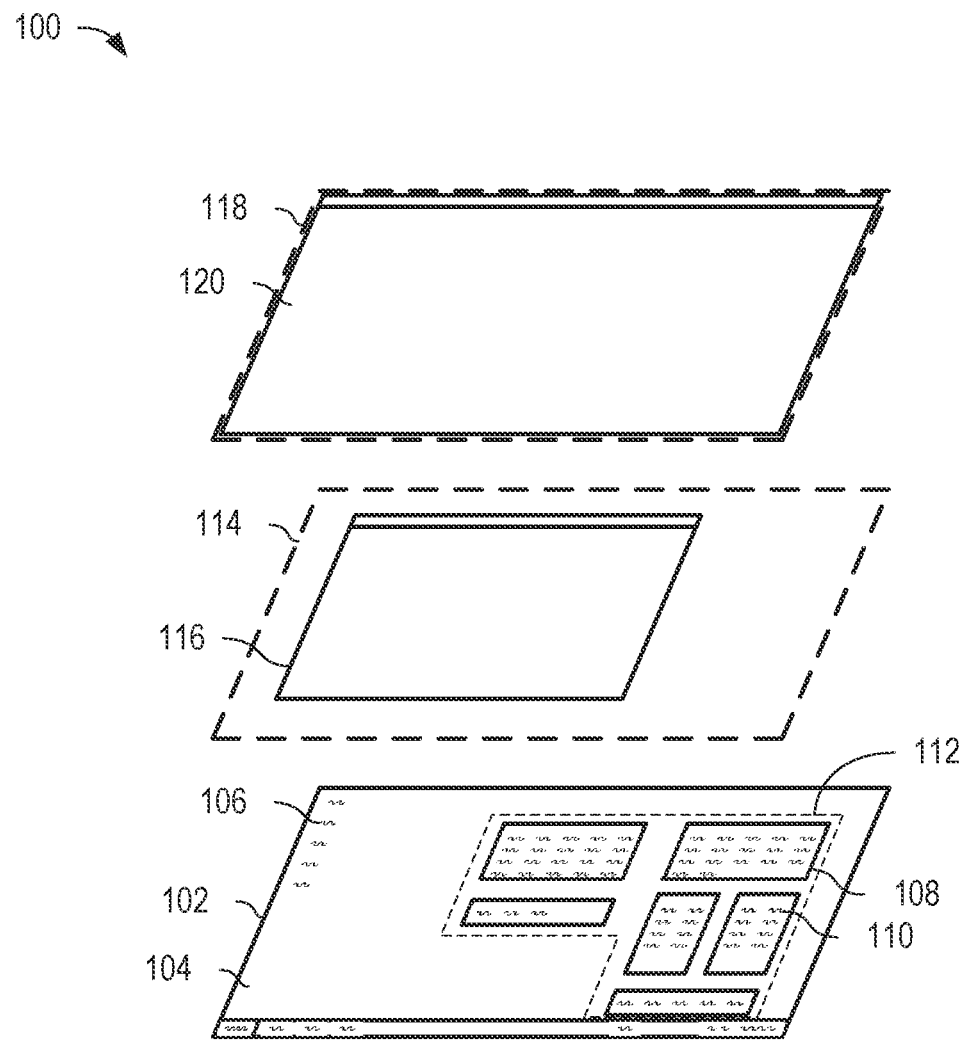
FIG. 1 is an exploded view of a window stack during normal use, according to certain aspects of the present disclosure.

Certain aspects and features of the present disclosure relate to systems and methods for managing desktop environments of computer operating systems (Oss or OS). A desktop of a graphical user interface (GUI) can be presented at a desktop layer of a window stack. Container(s) (e.g., desktop window(s)) that include one or more icons can be implemented as fenced off regions of the desktop, allowing users to interact with the containers and icons within while viewing the desktop. When the desktop is covered by other windows in the window stack, a depressed hotkey combination can cause the container(s) to pop above the other visible windows, allowing the user to interact with the containers and icons without needing to minimize or move the other visible windows. Releasing the hotkey combination permits the container(s) to move back down to their original position in the window stack. An example of a working window in the WINDOWS operating system is a WorkerW-class window.

As used herein, windows in a window stack can be described as having a certain Z-order, which can be a numerical value indicating where the window is located within the window stack. Windows with a higher Z-order can be considered as being "above" or "in front of" windows with a lower Z-order, which can be considered as being "underneath" or "behind" those with the higher Z-order. A desktop layer can be a lowest visible layer of the window stack, and can itself include one or more windows (e.g., desktop windows) having one or more Z-orders that together act as a desktop.

Certain aspects and features of the present disclosure can be implemented on any suitable desktop environment of any suitable OS. For illustrative purposes, certain aspects and features of the present disclosure will be described with reference to the Windows shell desktop environment provided by the Microsoft® Windows® operating system, using functions, properties, classes, and other terminology associated with that OS. In some cases, however, aspects and features of the present disclosure can be used with desktop environments of other Oss by using equivalent functions, properties, classes, and other elements for that OS.

Certain aspects and features of the present disclosure relate to an improved user interface that allows a user to quickly view and interact with desktop elements, such as desktop icons (e.g., icons within a container on the desktop) without the need to minimize, move, or close, other windows that may be covering the desktop. Certain aspects and features of the present disclosure provide a specific, structured graphical user interface that improves a user's ability to interact with elements of the desktop environment through a particular technique that can cause certain desktop elements to be presented above or otherwise in front of other windows. Certain aspects and features of the present disclosure provide for improvements in the functioning of Oss, and specifically desktop environments (e.g., Windows shell) by providing new, intuitive, and useful ways for a user to quickly interact with elements of the desktop environment.

Because of the nature of desktops within a windows stack of s desktop environment, moving elements of such a desktop to appear over other windows, such as windows of an open application, can be a non-trivial task, especially within the constraints of the desktop environment's available controls. Further, monitoring and managing keyboard input to ensure the hotkey combination is properly detected and to ensure unwanted actions are not taken can be a non-trivial task, especially within the constraints of an operating system's available controls.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is an exploded view of a window stack 100 during normal use, according to certain aspects of the present disclosure. The window stack 100 can include a desktop layer 102 and optionally any number of additional layers, such as a first application layer 114 and a second application layer 118. While described with application layers for illustrative purposes, a window stack 100 can include any number of windows of any type (e.g., any suitable class of window).

The desktop layer 102 can include a desktop window 104 and any number of associated windows that make up the desktop. The desktop window 104 can contain a number of icons 106. In Windows Shell, the desktop window 104 can be a desktop icon surface window containing a child window with class ShellDefView, which itself contains a child window with class SysListView32.

The first application layer 114 can include a first application window 116, which can contain the GUI elements of a first application. The second application layer 118 can include a second application window 120, which can contain the GUI elements of a second application. As depicted in FIG. 1, the first application window 116 is sized to occupy less than all of the available screen space, while the second application window 120 is sized to be full-screen (e.g., "maximized").

When viewing a display device displaying the desktop environment of the window stack 100, a user would see only the second application window 120, as it overlaps all windows below. If the second application window 120 were closed, the user would see the second application window 116 and portions of the desktop layer 102 not overlapped by the second application window 116.

It is understood that in some cases, instead of stopping lower Z-order windows from being seen (e.g., stopping the windows from being rendered), an overlapping window with a higher Z-order can be rendered as a translucent window, thus affecting the rendering of lower Z-order windows that are overlapped (e.g., causing the lower Z-order window to be rendered with a blur, with a washed out color, or otherwise depicted as being behind the translucent window).

Desktop layer 102 further includes a set of containers 112. The set of containers 112 can include one or more containers 108. Each container 108 can include one or more icons 110 or other elements. As depicted in FIG. 1, the set of containers 112 includes six containers 108, each having its own icons 110. Containers 108 can be implemented as windows associated with the desktop window 104 (e.g., child windows of the desktop window 104 or otherwise associated with the desktop window 104 such that the containers 108 behave as part of the desktop).

The window stack 100 depicted in FIG. 1 depicts a window stack 100 prior to implementation of a peek action (e.g., engagement of peek functionality) or after disengagement of a peek action (e.g., disengagement of peek functionality).

Figure 2:
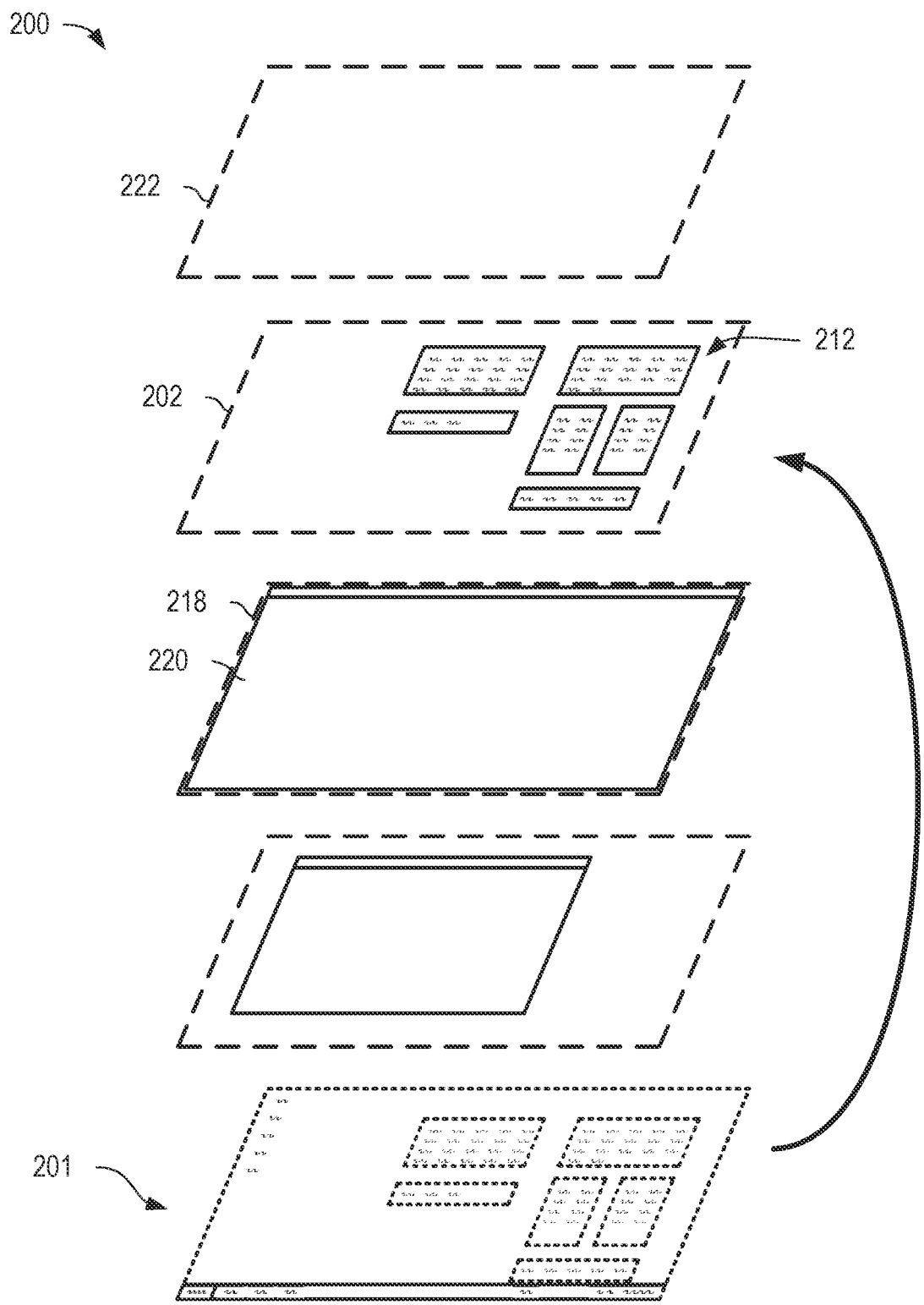
FIG. 2 is an exploded view of a window stack showing the peek functionality according to certain aspects of the present disclosure.

FIG. 2 is an exploded view of a window stack 200 showing the peek functionality according to certain aspects of the present disclosure. Window stack 200 can be window stack 100 after the peek action has been engaged.

While the peek action is occurring, the set of containers 212 is moved to a position within the window stack 200 that is above the previous highest Z-order visible layer, which was the second application layer 218. For illustrative purposes, the original location of the desktop layer 202 is depicted as item 201, although the desktop layer 202 need not exist at that original location while the peek action is occurring.

In some cases, only the windows associated with the set of containers 212 themselves are moved. However, in some cases, all windows of the desktop layer 202 can be moved to the new position, and a carve-out region can be applied such that only the set of containers 212 is rendered (e.g., portions of the desktop layer 202 that are not the set of containers 212 are hidden or otherwise not rendered). The carve-out region can be bounded by the boundaries of each container of the set of containers 212. Other carve-out regions can be used (e.g., carve-out around the boundaries of each icon within the set of containers 212, a single carve-out that encompasses all containers of the set of containers 212).

As depicting in FIG. 2, the set of containers 212 now has a Z-order that is greater than that of the second application window 220, and thus the set of containers 212 is visible over the second application window 220. When in this visible position, the user can interact with the elements (e.g., icons) within the set of containers 212 as if only the desktop was visible. Further, because of the presence of the set of containers 212 over the second application window 220, which is not minimized, closed, or moved out of the way, the user is able to drag and drop items from the set of containers 212 into the second application window 220. For example, if the second application window 220 was a timeline view in a video editing application, movie files located within the set of containers 212 could be dragged and dropped from the desktop onto the timeline without needing to minimize, close, or otherwise move the second application window 220.

Further, certain aspects and features of the present disclosure permit the user to press and hold a key combination to activate the peek functionality, without undesired effects otherwise associated with pressing and holding the keys of the key combination. In some cases, other triggers can be used to generate an engagement signal to activate the peek functionality, such as double-clicking the menu bar at the edge of the screen, making a gesture on a touch-sensitive device (e.g., a touchpad or touchscreen), issuing a voice command, or the like.

In some cases, as disclosed in further detail herein, an invisible guidance window 222 is generated to assist in placing the desktop layer 202 in the desired location. The invisible guidance window 222 can be placed at the top of the window stack 200, allowing desktop window(s) of the desktop layer 202 to be placed below (e.g., immediately below) the invisible guidance window 222, thus ensuring the desktop window(s) of the desktop layer 202 are above other visible windows in the window stack 200.

As used herein, the "top" of a window stack 200 can be the top of the entire window stack 200 or the top of a particular group of windows within a window stack 200. For example, in some cases a desktop environment can make use of a multi-group windowing system that maintains certain types of windows (e.g., system notifications) in a separate grouping from other windows (e.g., standard desktop windows and application windows). In such a system, in some cases, moving a desktop window to a top of the window stack 200 can be considered as moving it to the top of all other windows in its grouping, in which case the desktop window may still be below system notification windows within the entire window stack 200.

Figure 3:
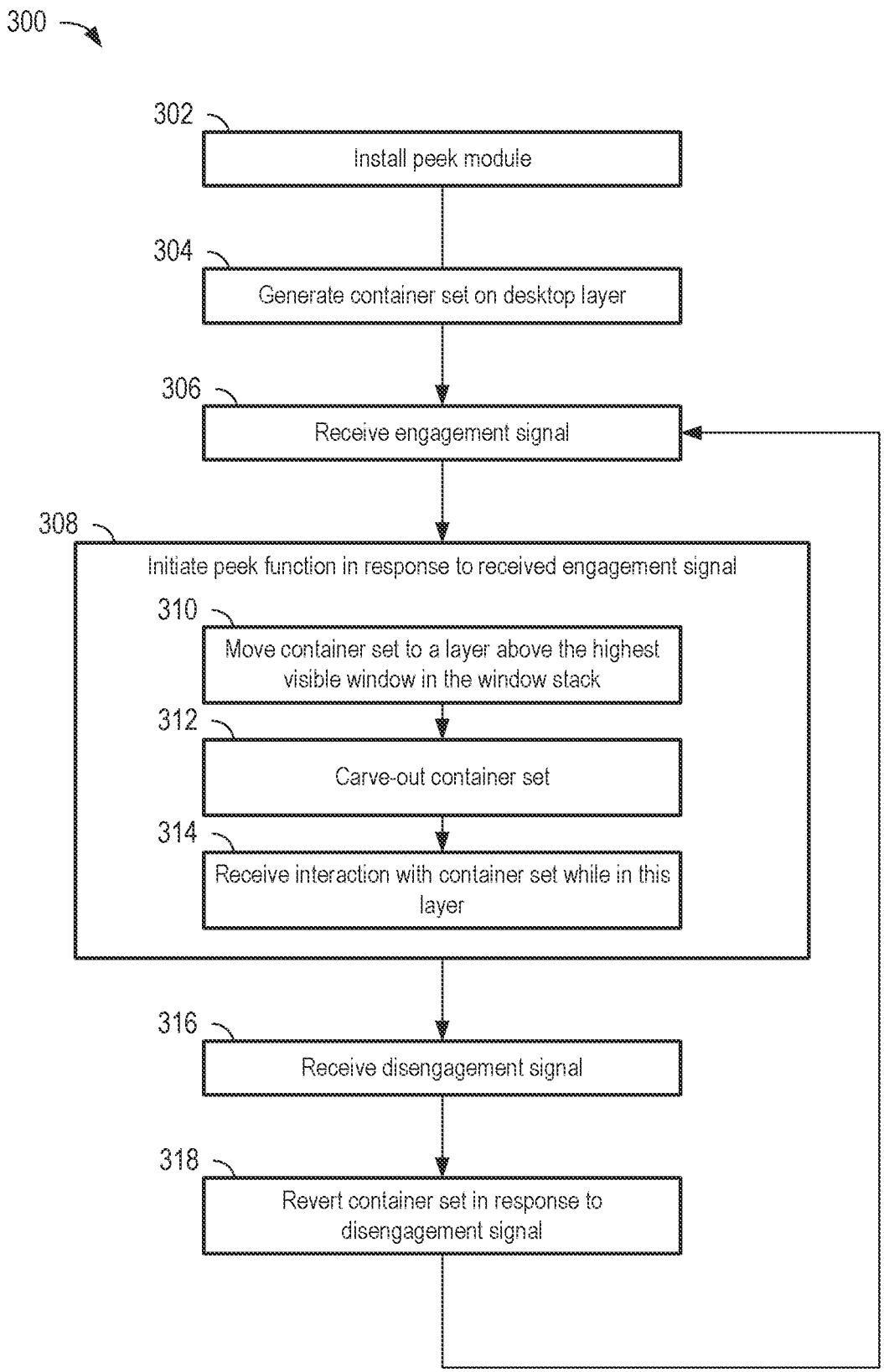
FIG. 3 is a flowchart depicting a process for installing and using a peek module according to certain aspects of the present disclosure.

FIG. 3 is a flowchart depicting a process 300 for installing and using a peek module according to certain aspects of the present disclosure. The peek module can include any and all executables, libraries, or other files necessary to effectuate the peek functionality. In some cases, the peek module can include both a trigger module and a presentation module, although that need not always be the case. The trigger module can monitor for and manage events that trigger the peek functionality (e.g., a keyboard module monitoring for a hotkey combination to be depressed) and/or trigger disengagement of the peek functionality. The presentation module can handle manipulating the graphical user interface to present the container set above the highest visible window in the window stack and revert it.

At block 302, the peek module can be installed. In some cases, installing the peek module can include installing the trigger module to execute with elevated privileges, such as executing as SYSTEM, executing as a root user, or executing as an administrator. For example, in the Microsoft® Windows® OS, an executable of the trigger module can be set up to launch as SYSTEM on any user login, which can be accomplished by creating an appropriate task manager entry to initiate that execution. In some cases, the trigger module can thus execute at the next login, or can by manually or programmatically executed. Launching with such elevated privileges can permit the trigger module to work on applications run in an administrator mode.

In some cases, installing the peek module at block 302 can include initializing the peek module. In some cases, initializing the peek module occurs during or after a user logs into the computer system. Initializing the peek module can include, after launching the trigger module with elevated privileges, re-launching itself into user space for the logged-in user to operate in the user's execution space. In some cases, initializing the peek module can include installing the presentation module into the desktop environment. For example, in a Microsoft® Windows® OS, the presentation module can be installed into Explore by installing a message hook (e.g., WH_GETMESSAGE) to inject into the Explorer process, and subclass the desktop windows (e.g., a ProgMan window). Also, a custom global message can be registered and posted to the ProgMan window to facilitate identifying the desktop window(s) as a custom subclass (e.g., KeyboardHookCustomSubclass).

In some cases, initializing the peek module can include initializing the trigger module, which can include locking the library file (e.g., dynamic link library, or DLL) associated with the trigger module to avoid modification of the file while the trigger module is running with elevated privileges.

Locking the library file can include opening the file for exclusive read. Initializing the trigger module can further include initializing any global variables to be used and loading any necessary settings from the registry. Initializing the trigger module can further include installing the appropriate hook to monitor user input, such as installing a keyboard hook (e.g., WH_KEYBOARD_LL) to monitor keyboard input. Initializing the trigger module can further include setting up a message loop, which can include starting a thread for the message loop, creating a window with a custom window procedure, registering the window to receive SHELLHOOKS, and beginning a message loop to await commands.

In some cases, initializing the peek module can further include subclassing the desktop, which can include locking the library file for the presentation module into memory by loading the library file for a second time on the current module's HINSTANCE. Subclassing the desktop can further include registering a custom global message (e.g., "KeyboardHookCustomSubclass") and posting the message to the ProgMan window. In response to receiving the "KeyboardHookCustomSubclass" message, the system can detect if the ProgMan window is subclassed. If it is now, the system can attempt to subclass the ProgMan window. Thereafter, the system can wait further messages in the ProgMan subclass procedure.

At block 304, a container set on a desktop layer can be generated. Generating the container set can include establishing one or more containers on the desktop layer, and populating the one or more containers with elements (e.g., icons). Each container can be a window of the desktop layer that is used to contain elements therein. In some cases, a container can be manually populated, such as by dragging and dropping items into the container. In some cases, a container can be automatically or programmatically populated (e.g., automatically populating with the ten most recently modified files). Any suitable technique for populating a folder in an OS can be used to populate a container. In some cases, a container can itself be associated with a folder or directory on the OS, in which case the container will automatically be populated with the elements from that folder or directory.

At block 304, an engagement signal can be received. Receiving an engagement signal can include receiving any suitable signal to begin engagement of the peek functionality, such as those described herein. In some cases, the engagement signal can be received in response to a user depressing a particular hotkey combination (e.g., combination of one or more keys) or otherwise taking a particular triggering action (e.g., double clicking the menu bar at the edge of the screen). In an example, receiving the engagement signal can include detecting, by the trigger module, that a hotkey combination has been depressed, and sending an appropriate signal to the presentation module to initiate the peek functionality.

At block 308, in response to receiving the engagement signal, the peek functionality can be initiated. Initiating the peek functionality, or initiating the peek function, can include moving the container set to a layer above the highest visible window in the window stack at block 310. Moving the container set at block 310 can include moving one or more containers of the container set alone, or along with other desktop windows.

In some cases, the entire desktop layer can be moved at block 310. In such cases, either the entire desktop layer can be presented, or a carve-out region can be used to present only the container set. In such cases, at block 312, the container set can be carved out. Carving out the container set at block 312 can include generating a carve-out region (e.g., based on the one or more containers of the container set) and applying the carve-out region to the desktop layer such that only the portion of the desktop layer within the carve-out region is presented.

At block 314, an interaction can be received with the container set while the container set is in the layer to which it moved in block 310. Receiving an interaction with the container set can include receiving an action with the container set itself or with an element of the container set (e.g., an icon within the container set). For example, receiving an interaction with the container set at block 314 can include selecting, and optionally opening or dragging-and-dropping a file from a container into another window (e.g., an application window normally obscuring the desktop when the desktop is in its normal position in the window stack). In another example, receiving an interaction with the container set at block 314 can include moving an item, such as a file, into the container set from another window.

In some cases, initiating the peek function at block 308 can result in moving the container set from a position depicted in window stack 100 of FIG. 1 to a position depicted in window stack 200 of FIG. 2.

At block 316, a disengagement signal can be received. The disengagement signal can be an automatic signal (e.g., an automatic signal that occurs after an elapsed period of time or after a particular action has been taken, such as the interaction from block 314) or can be a manual signal (e.g., a signal that occurs in response to releasing one or more keys of the hotkey combination or upon taking another action, such as double-clicking the menu bar at the edge of the screen again).

In some cases, as described in further detail herein, initiating the peek function at block 308 can further include simulating the pressing or release of one or more keys (e.g., the release of the keys of the hotkey combination) to the operating system to avoid undesired actions while the user holds the keys down to maintain the peek functionality.

At block 318, in response to receiving the disengagement signal, the container set can be reverted to its previous position in the window stack (e.g., its position in the window stack prior to initiating the peek function at block 308, such as the bottom of the window stack). Reverting the container set can include reverting the various steps taken to initiate the peek function at block 308.

While process 300 is depicted with certain blocks in a certain order, in some cases, process 300 can be performed using fewer blocks, more blocks, or different blocks than those shown. Additionally, in some cases, certain blocks can be performed in different orders and/or certain sub-blocks can be adapted to operate in different parent blocks. For example, in some cases generating the container set at block 304 can occur before installation of the peek module at block 302.

Figure 4:
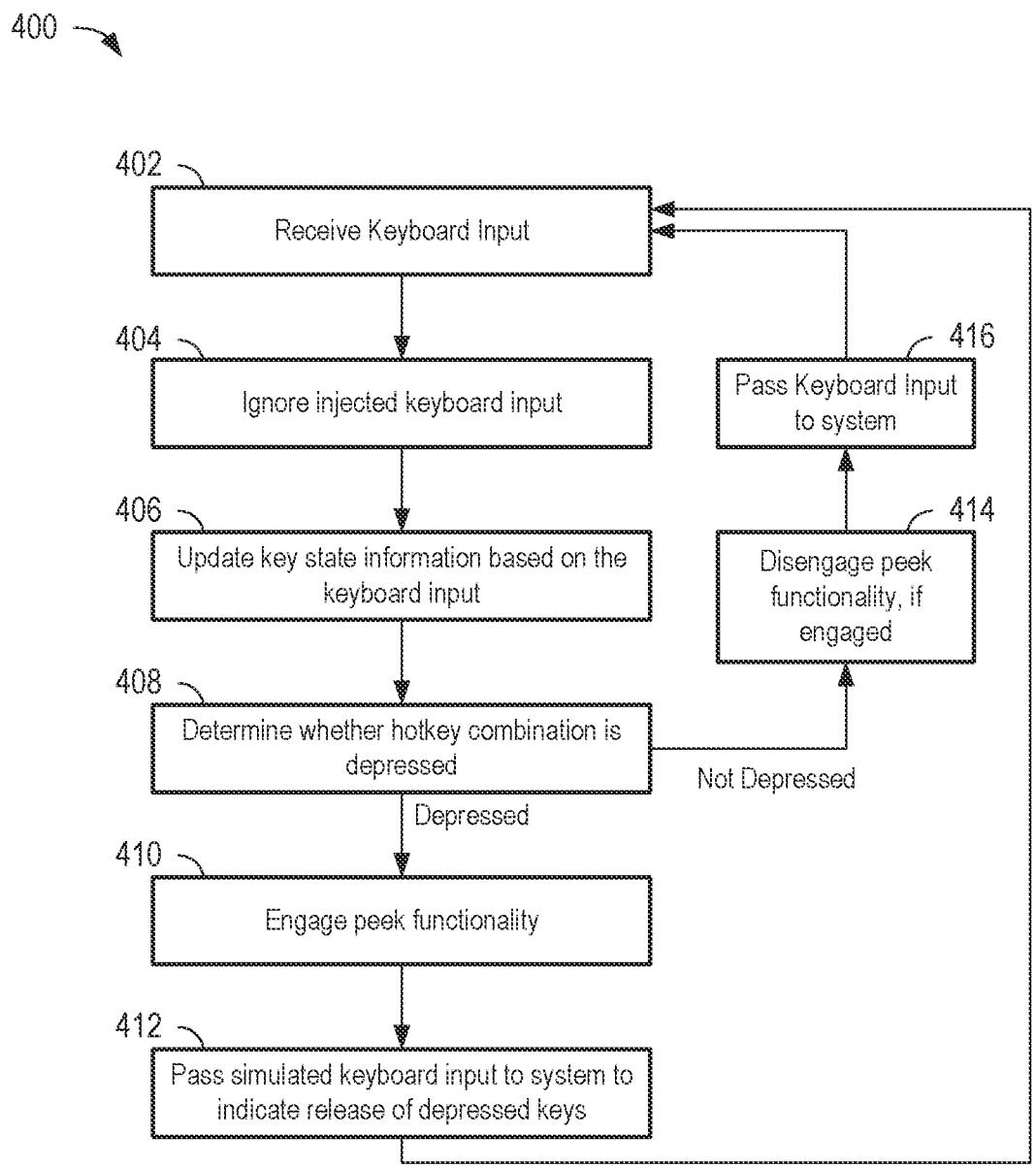
FIG. 4 is a flowchart depicting a process for monitoring for a hotkey combination according to certain aspects of the present disclosure.

FIG. 4 is a flowchart depicting a process 400 for monitoring for a hotkey combination according to certain aspects of the present disclosure. Process 400 can be used to generate an engagement signal that can be received at block 306 of FIG. 3 and/or a disengagement signal that can be received at block 316 of FIG. 3. Certain aspects of process 400 permit the engagement signal to occur in response to a hotkey combination being depressed, and permit a disengagement signal to occur in response to the hotkey combination being released, thus effecting a press-and-hold operation.

Certain aspects of process 400 can be implemented to ensure that a hotkey combination can be used to initiate and keep the peek functionality implemented until some or all of the hotkey combination is released, all while ensuring that the held hotkeys do not have a detrimental impact elsewhere in the OS. For example, if a hotkey combination includes a Shift or Control key, a user holding down those keys to engage the peek functionality may inadvertently cause files interacted with in the container set to be copied or moved if the OS believes those modifier keys are held down while the user drags and drops an icon from the container set. Other complications may occur for other key combinations, such as if a hotkey combination includes certain keys (e.g., the "D" key), the OS may interpret holding the key down as a repeated input (e.g., repeatedly pressing the "D" key) if the OS continues to believe the key is being held down.

Process 400 uses simulated keyboard input to let the system think the held hotkeys have been released, while also separately tracking the state of the hotkeys to both identify when some or all of them have been released, and/or to identify when subsequent re-presses have occurred. For example, process 400 can be especially useful to allow a peek functionality to i) be engaged when the hotkey combination is pressed; ii) be disengaged when one key of a multi-key hotkey combination is released; and iii) be reengaged when that released key is re-pressed prior to releasing the other keys of the hotkey combination. Without the internal tracking provided by process 400, a system would not realize that the hotkey combination is still pressed when the user re-pressed the released key, since the OS would have thought that the other keys of the hotkey combination were already released, as described above.

At block 402, keyboard input can be received. Receiving keyboard input can include receiving messages indicative of a keyboard event (e.g., a key press, a key release, or the like). In some cases, receiving keyboard input at block 402 can include receiving a keycode associated with the input, an indication of whether or not the input was an injected input (e.g., a software or programmatic input, such as provided at block 412, instead of a user-provided input), an indication of whether the event is a key-up event, and/or an indication of whether the event is a key-down event. The injected indication can be provided by LLKHF_INJECTED and LLKHF_LOWER_IL_INJECTED parameters. The key-up indication can be provided by LLKHF_UP, WM_KEYUP, and SYSKEYUP parameters. The key-down indication can be provided by the inverse of the key-up indication, by a WM_KEYDOWN parameter, and by a WM_SYSKEYDOWN parameter.

At block 404, certain undesired keyboard input can be ignored for purposes of process 400. Ignored input can be passed to the rest of the OS. Keyboard input to be ignored can include injected keyboard input. In some cases, ignoring keyboard input at block 404 only occurs while the peek functionality is engaged or while the system is otherwise set to ignore input.

At block 406, key state information can be updated based on the keyboard input from block 402. Updating the key state information can include storing information about the key state of the key associated with the keyboard input. Updating the key state information can include storing the key state information in storage (e.g., memory) that is separate from where the OS stores key state information. The key state information stored at block 406 can thus be considered "internal" to the peek functionality.

Key state information updated at block 406 can include i) a pressed state for one or more keycodes; ii) a last activity time for one or more keycodes; iii) a general last activity time for any key; iv) a general WasInputManipulated flag; v) a LastInputManipulatedTime value; vi) an IsHotkeyPressed value; vii) an IgnoreInput flag; or viii) any combination of i-vii.

In some cases, updating the key state information at block 406 can include resetting stale key state information as needed, which can include determining that a threshold period of time (e.g., 60 seconds) has elapsed since the last key has been pressed and resetting the stored pressed state of all keys to "unpressed" and resetting a "WasInputManipulated" flag to false.

In some cases, updating the key state information at block 406 can include updating the pressed state for a current key as signaled by the event (e.g., keyboard input). For example, when the keyboard input indicates that the "D" key is pressed, the pressed state for the "D" keycode can be updated to be pressed. In some cases, the presence of a key-up or key-down flag can be used to update the pressed value as appropriate (e.g., pressed in response to a key-down flag and unpressed in response to a key-up flag). The time of the last action associated with the keycode and/or the general last activity time for any key values can be updated.

In some cases, updating the key state information at block 406 can include verifying one or more key states. In such cases, if a modifier key may have been pressed and the "WasInputManipulated" flag is false, the state of the modifier key can be verified using the OS-reported state (e.g., using a GetAsyncKeyState function). If the system reports that the key is not pressed and it has been over a threshold time (e.g., 60 seconds) since the key was last pressed according to the stored key state information, then the stored key state information can be updated to reset that key's state to unpressed. If a non-modifier key may have been pressed and the "WasInputManipulated" flag is false, the state of the non-modifier key can be verified using the OS-reported state (e.g., using a GetAsyncKeyState function). If the system reports that the key is not pressed, then the stored key state information can be updated to reset that key's state to unpressed.

At block 408, a determination can be made as to whether or not the hotkey combination has been depressed. Determining whether or not the hotkey combination has been depressed can include determining whether or not each of the keys of the hotkey combination is marked as pressed in the key state information from block 406. The hotkey combination can include any suitable number of keys, such as one key, two keys, or three or more keys. In some cases, determining whether the hotkey combination is depressed at block 408 includes determining that a state of whether or not the hotkey combination is depressed has changed due to receiving the keyboard input from block 402. In other words, if the hotkey combination is already depressed, pressing further keys will not result in an additional determination that the hotkey combination is depressed or not depressed, but will instead be ignored. Tracking the current and previous state of whether or not the hotkey combination is depressed can be achieved using a IsHotkeyPressed New value (e.g., a current value associated with the keyboard input) and a IsHotkeyPressed value (e.g., the most recent value), such that action is taken and the IsHotkeyPressed value is only updated when it differs from the IsHotkeyPressed new value.

If the hotkey combination is determined to be depressed, the peek functionality can be engaged at block 410. Engaging the peek functionality can include passing an engagement signal to the appropriate module (e.g., the presentation module) to engage the peek functionality. Also, engaging the peek functionality at block 410 can include setting the IgnoreInput value to true such that injected keyboard input is ignored at block 404.

In some cases, when the peek functionality is engaged, keyboard input received at block 402 that match certain preset keys (e.g., VK_LWIN, VK_RWIN, or non-modifier keys) can be intercepted and not passed to other hooks or other parts of the OS if the LastInputManipulatedTime is greater than 0 but is further than 250 ms ago.

In response to and/or as part of engaging the peek functionality at block 410, simulated keyboard input can be generated and passed to the rest of the OS at block 412. The simulated keyboard input can indicate that the keys marked as pressed from the key state information from block 406 are now released. In some cases, at block 412, an IgnoreInput flag can be set to true to indicate to the system that it is okay to start ignoring injected keyboard input at block 404, a WasInputManipulated flag can be set to true to indicate that the OS's version of the current keycode states was manipulated, and a key-up event (e.g., keybd_event/ KEYEVENTF_KEYUP) can be sent for each key involved in the hotkey combination that is pressed, thus informing the OS that these keys are now unpressed.

In some cases, passing the simulated keyboard input at block 412 can include setting the LastInputManipulatedTime value to the current time, which, in conjunction with the IsHotkeyPressed parameter, can be used to prevent would-cause-improper-behavior inputs from being passed on to other applications for the duration that the hotkey combination is depressed.

Additionally, in some cases, the simulated keyboard input can further simulate that certain keys are depressed, such as to avoid undesired interactions when the OS would otherwise take action in response to one of the keys of the hotkey combination being depressed and released. For example, if a Windows key were used in a hotkey combination, the OS, upon identifying that the Windows key was pressed from the keyboard input and believing that the Windows key was released from the simulated keyboard input, would open the Start menu. However, if the simulated keyboard input further includes pressing and releasing an additional key (e.g., the Shift key), the OS would not cause the Start menu to appear.

In some cases, if the determination at block 408 is that the hotkey combination is no longer depressed, the process 400 can continue by disengaging, at block 414, the peek functionality if it is engaged, and passing the keyboard input to the rest of the OS at block 416.

In some cases, if the received keyboard input from block 402 and/or other input indicates a session change (e.g., the system is locked, unlocked, or disconnected, such as via a WM_WTSSESSION_CHANGE message with the parameter WTS_SESSION_LOCK, WTS_SESSION_UNLOCK, or WTS_REMOTE_DISCONNECT), the internal key state information (e.g., key state information from block 406) can be reset such that each keycode is indicated as not pressed.

While process 400 is depicted with certain blocks in a certain order, in some cases, process 400 can be performed using fewer blocks, more blocks, or different blocks than those shown. Additionally, in some cases, certain blocks can be performed in different orders and/or certain sub-blocks can be adapted to operate in different parent blocks.

Figure 5:
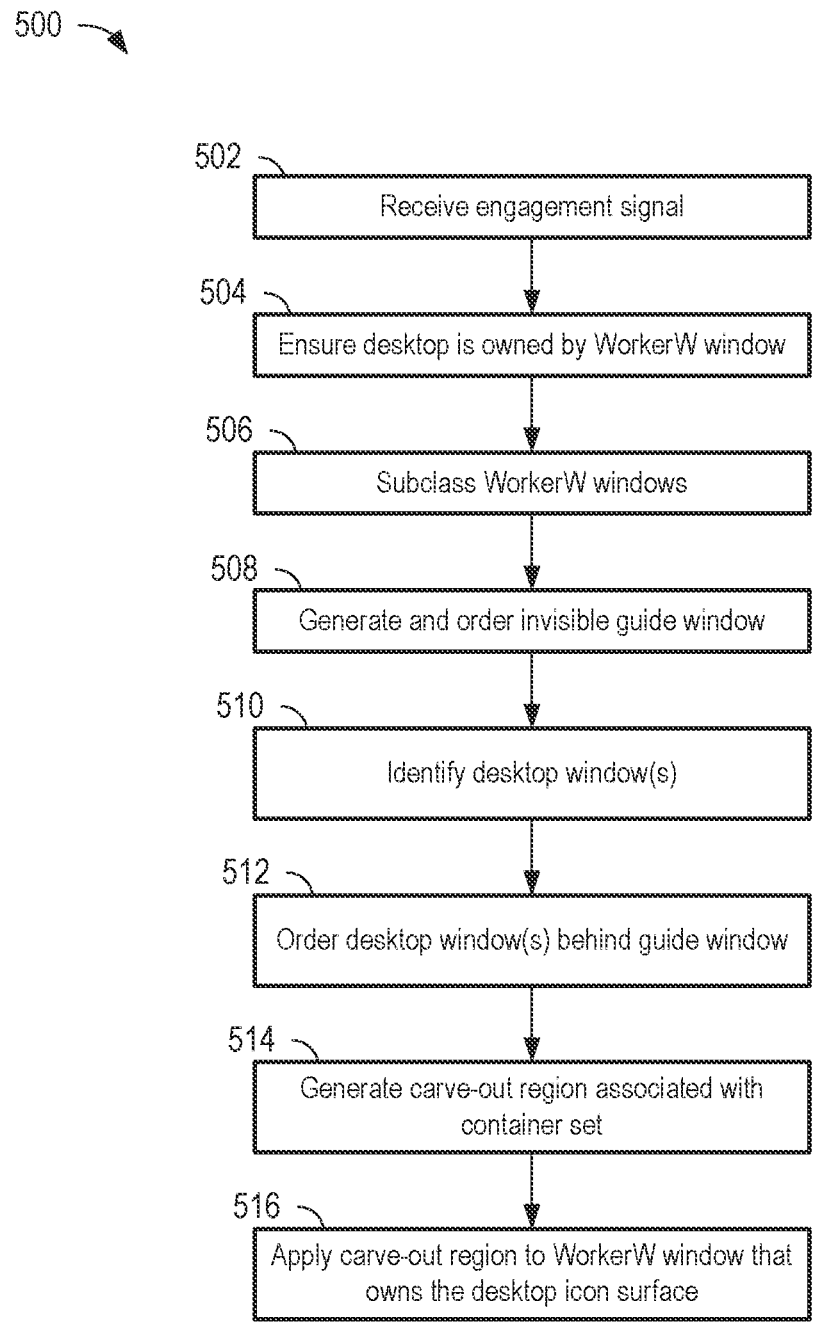
FIG. 5 is a flowchart depicting a process for initiating a peek function according to certain aspects of the present disclosure.

FIG. 5 is a flowchart depicting a process 500 for initiating a peek function according to certain aspects of the present disclosure. Process 500 can be used to initiate a peek function, such as described with reference to block 308 of FIG. 3. Certain aspects and features of process 500 provide a specialized technique for detaching the desktop surface from the lowermost layer of the window stack, since normally the desktop environment will force the desktop surface to remain at the lowermost layer.

At block 502, an engagement signal can be received, such as an engagement signal received from process 400 of FIG. 4 (e.g., from block 410 of FIG. 4).

At block 504, action is taken to ensure the desktop is in the WorkerW-based system. If it is determined that the desktop (e.g., the ShellDefView/SysListView32 window) is owned by a WorkerW window, no further action is needed at block 504. If it is determined that the desktop (e.g., ShellDefView/SysListView32 window) is not owned by a WorkerW window, a process can occur to guide the desktop into the WorkerW-based system. This process can include i) ensuring that it has been at least a threshold time (e.g., 100 ms) since a previous attempt; ii) recording the time and state that the engagement signal is received; iii) sending message 0x052C with wParam 0 and lParam 0 to the root ProgMan window to spawn a WorkerW window; iv) posting a message to self to allow the message sent to ProgMan sufficient time to complete its processing and pick up processing upon receipt of this message; v) sending message 0x052C with wParam 1 and lParam 0 to the root ProgMan window; vi) posting a message to self to allow the message sent to ProgMan sufficient time to complete its processing and pick up processing upon receipt of this message; and vii) observing whether or not a dis-engage signal has been received since beginning the process, and aborting further processing if the disengage signal has been received.

At block 506, the WorkerW windows, including the desktop windows, can be subclassed. Subclassing the WorkerW windows can include identifying and subclassing all WorkerW windows. Subclassing the WorkerW windows can include locking the WorkerW windows from being automatically repositioned by the desktop environment. At block 506, a LockWorkerWZorder parameter can be established and set to true. Within the subclass procedure, in response to the message WM_WINDOWPOSCHANGING, the LockWorkerWZorder parameter can be evaluated, and if true, can block changes in the Zorder by applying the flags SWP_NOOWNERZORDER and SWP_NOZORDER to the flags parameter of WINDOWPOS.

At block 508, an invisible guide window can be generated and ordered in the window stack. Generating and ordering the invisible guide window can include creating the invisible guide window and positioning it at the top of the window stack. In some cases, ordering the invisible guide window can include applying a series of ordering actions to ensure the invisible guide window is in the proper position. In some cases, this series of ordering actions includes using the SetWindowPos function to set the invisible guide window first to HWND_TOPMOST, then to HWND_TOP, then to HWND_NOTTOPMOST, and then to HWND_TOP. This series of ordering actions ensure that the invisible guide window is initially at the top of the topmost ground of windows in the window stack, then the top of the nottopmost group of windows.

At block 510, the desktop window(s) can be identified. Identifying the desktop window(s) at block 510 can include performing an EnumWindows function to capture the list of all WorkerW-class windows starting with the desktop layer and beneath by ignoring all WorkerW windows until the desktop icon surface window is found, then identifying all remaining WorkerW windows. The desktop icon surface window can be identified as the WorkerW window containing a child window with class ShellDefView, which itself contains a child window of class SysListView32.

At block 512, the desktop window(s) identified at block 510 can be moved in the window stack behind the invisible guide window. Moving the desktop window(s) at block 512 can include using a SetWindowPos function to place the first of the identified windows, which is the desktop icon surface window, underneath the invisible guide window. In some cases, if a carve-out option is enabled, no further desktop windows need be moved. However, if a carve-out option is not enabled, each subsequent desktop window identified at block 512 underneath the desktop icon surface window can be positioned, using a SetWindowPos function, underneath the window before it, thus recreating the desktop windows, in their original order, beneath the invisible guide window. In some cases, each of the moved windows, or at least each of the moved windows other than the desktop icon surface window, can be marked with a property indicating that its Z-order has been modified.

At block 514, if a carve-out option is enabled, a carve-out region can be generated in association with the container set. The carve-out region can be a combination of the outer boundaries of each of the visible containers of the container set, although that need not always be the case. For example, in some cases a single large rectangle can be used that encompasses multiple containers of the container set, or a carve-out region can be generated based on the outlines of the icons within the containers of the container set. In some cases, generating the carve-out region can include creating a HRGN area.

At block 516, if a carve-out option is enabled, the carve-out region can be applied to the WorkerW window that owns the desktop icon surface that was moved at block 512. The carve-out region can be applied by using the function SetWindowRgn, which can cause only the portion of the WorkerW window within the carve-out region to be rendered and displayed.

While process 500 is depicted with certain blocks in a certain order, in some cases, process 500 can be performed using fewer blocks, more blocks, or different blocks than those shown. Additionally, in some cases, certain blocks can be performed in different orders and/or certain sub-blocks can be adapted to operate in different parent blocks.

Figure 6:
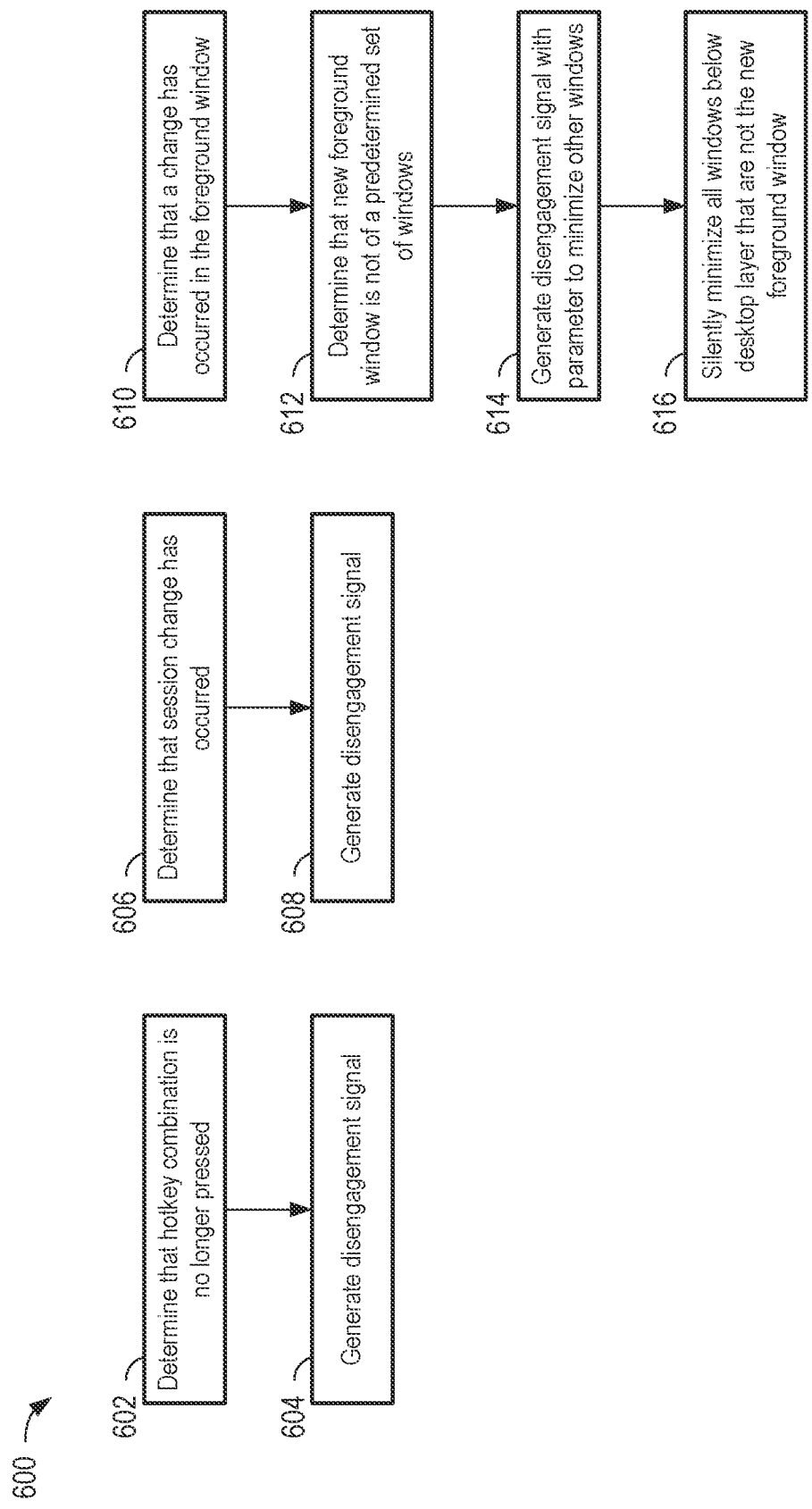
FIG. 6 is a flowchart depicting a process for determining when to disengage the peek function according to certain aspects of the present disclosure.

FIG. 6 is a flowchart depicting a process 600 for determining when to disengage the peek functionality according to certain aspects of the present disclosure. Process 600 can be used to determine and generate the disengagement signal that is received at block 316 of FIG. 3. Process 600 permits the system to properly disengage the peek functionality across a variety of situations, and to handle disengagement in a visually appealing and intuitive fashion.

At block 602, a determination can be made that a hotkey combination is no longer present. This determination can be or be similar to the determination made at block 408 of FIG. 4. In response to the determination from block 602, a disengagement signal can be generated at block 604. The disengagement signal can be used to disengage the peek functionality, such as described with reference to blocks 316, 318 of FIG. 3.

At block 606, a determination can be made that a session change has occurred. This session change can be or be similar to the session change described with reference to process 400 of FIG. 4 (e.g., a session change to lock, unlock, or disconnect a session). In response to the determination from block 606, a disengagement signal can be generated at block 608. The disengagement signal can be used to disengage the peek functionality, such as described with reference to blocks 316, 318 of FIG. 3.

At block 610, a determination can be made that a change has occurred in the current foreground window, such as another window taking the foreground. The determination can be made in response to receiving a SHELLHOOK message. A parameter (e.g., ShellHookForegroundLast) can be used to track the last HWND in the foreground. A change in the foreground window (e.g., a new window is now in the foreground) can be detected by comparing the ShellHook-ForegroundLast parameter with (HWND) lParam. In some cases, determining that a change has occurred in the current foreground window also includes determining that the wParam equals HSHELL_WINDOWACTIVATED and the peek functionality is engaged (e.g., the IsHotkeyPressed value from process 400 of FIG. 4 is true). Upon detecting the change in the foreground window, the value of lParam can be stored as the new ShellHookForegroundLast value.

At block 612, in response to determining that a change has occurred in the foreground window, a determination can be made that the new foreground window is not of a predetermined set of windows to be excluded from process 600. The predetermined set of windows to be excluded can be all windows having a class name that matches a set of class names. In some cases, the set of class names to exclude include i) Shell TrayWnd; ii) ProgMan; iii) IME; iv) WorkerW; v) MSCTFIME UI; vi) tooltips class32; vii) #32768; or viii) Windows.UI.Core.CoreWindow. In some cases, the predetermined set of windows to be excluded can include windows for which the GWL_EXSTYLE parameter of the window is WS_EX_TOOLWINDOW. If the new foreground window is one of the predetermined set of windows, process 600 can stop.

However, if the determination at block 612 is that the new foreground window is not one of the predetermined set of windows, process 600 can continue at block 614 by generating a disengagement signal with a parameter to minimize other windows. The disengagement signal can be used to disengage the peek functionality, such as described with reference to blocks 316, 318 of FIG. 3.

Since the disengagement signal includes the parameter to minimize other windows, at block 616, all windows below the desktop layer except for the new foreground window can be silently minimized. This functionality simulates the Win+D functionality of the Windows Shell used to show the desktop, and thus allows the peek functionality to fit more seamlessly into the desktop environment experience. Silently minimizing the windows below the desktop layer other than the new foreground window can include i) storing the current system minimization animation setting (e.g., via a SystemParamterslnfo SPI_GETANIMATION function); ii) Disabling system minimization animations (e.g., via a SystemParameterslnfo SPI_SETANIMATION function); iii) minimizing the desired windows; and iv) restoring the system minimization animation setting. Minimizing the desired windows can include enumerating all toplevel windows, ignoring all windows above the current desktop window (e.g., above the WorkerW containing the desktop icons), ignoring all windows that match the current foreground window (e.g., via the ShellHookForegroundLast value) (e.g., via GetAncestor/GA_ROOT function), and ignoring minimize-ineligible windows (e.g., hidden windows, windows whose GWL STYLE does not contain WS_MINIMIZEBOX, windows whose GWL_STYLEX contains WS_EX_TOPMOST or WS_EX_NOACTIVATE, and windows whose window rectangle as returned from GetWindowRect returns an empty rectangle). The remaining windows can then be minimized (e.g., minimized via a SendMessageTimeout/WM_SYSCOMMAND/SC_MINIMIZE function with SMTO_ABORTIFHUNG and a timeout of 1000).

Certain aspects and features of process 600 as described with reference to blocks 610, 612, 614, and 616 can simulate a Show Desktop functionality that appears the same as the OS's native Show Desktop functionality. This ability can be important since the OS's native Show Desktop functionality may not function suitably when the desktop layer is not at the lowermost layer of the window stack. Generally, OS-native Show Desktop functionality minimizes all windows to show the desktop, and when a window is activated, simply does not restore the other windows. Since the peek functionality brings the desktop layer above other windows, similar Show Desktop functionality is achieved when a user activates another window by quickly and quietly minimizing the other windows that are below the desktop layer.

In some cases, generating the disengagement signal at blocks 604, 608, and 614 can include setting a LastInputManipulatedTime flag (e.g., as described with reference to process 400 of FIG. 4) to a current time. Doing so, in conjunction with the IsHotkeyPressed flag, can prevent would-cause-improper-behavior input from being passed on to other applications for the duration of the press-hold operation's release.

While process 600 is depicted with certain blocks in a certain order, in some cases, process 600 can be performed using fewer blocks, more blocks, or different blocks than those shown. Additionally, in some cases, certain blocks can be performed in different orders and/or certain sub-blocks can be adapted to operate in different parent blocks.

Figure 7:
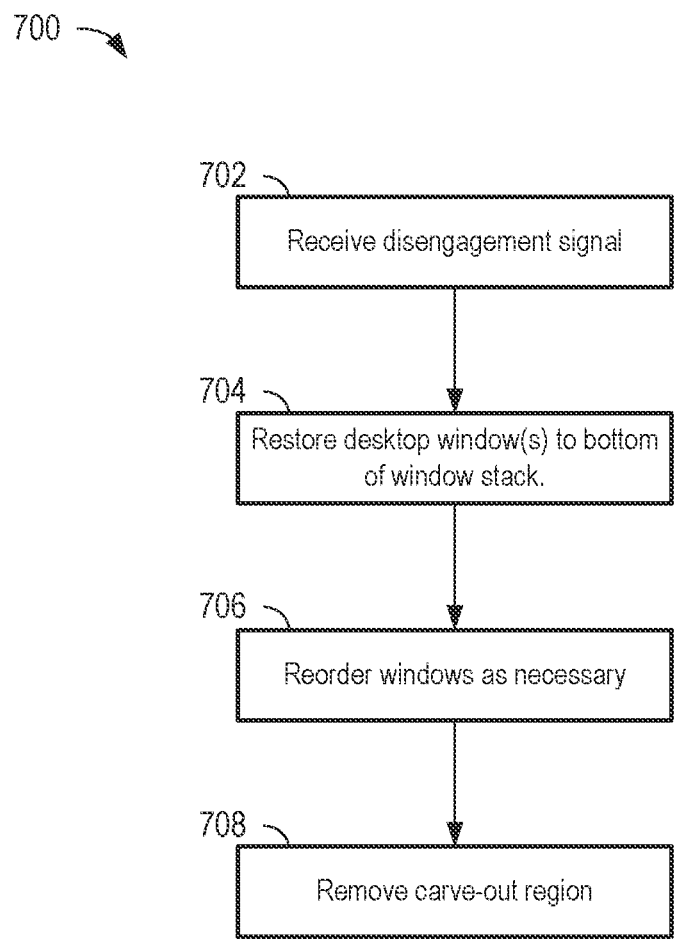
FIG. 7 is a flowchart depicting a process for disengaging the peek function according to certain aspects of the present disclosure.

FIG. 7 is a flowchart depicting a process 700 for disengaging the peek function according to certain aspects of the present disclosure. Process 700 can be used to revert the container set at block 318 of FIG. 3.

At block 702, a disengagement signal can be received. Receiving a disengagement signal can be similar to receiving the disengagement signal of block 316 of FIG. 3. Such a disengagement signal can be any suitable disengagement signal, such as those generated at blocks 604, 608, and 614 of FIG. 6.

At block 704, the desktop window(s) can be restored to the bottom of the window stack. Restoring the desktop window(s) can include permitting the desktop environment to once again control the Zorder of the windows, such as by setting the LockWorkerWZorder value (e.g., as described with reference to process 500 of FIG. 5) to false.

In some cases, restoring the desktop window(s) to the bottom of the window stack at block 704 can include moving the invisible guide window to the bottom, such as via a SetWindowPos/HWND_BOTTOM function with flags SWP_NOSENDCHANGING, SWP_NOMOVE, SWP_NOSIZE, SWP_NOOWNERORDER, and SWP_NOACTIVATE.

Thereafter, the desktop window(s), starting with the desktop-icon-surface-containing WorkerW window, can be placed under the invisible guide window (e.g., via a SetWindowPos function). In some cases, other windows marked as having a modified Z-order (e.g., as described with reference to block 512 of FIG. 5) can be identified (e.g., via an EnumWindows function ignoring all windows without a Zorder modified flag), and each subsequent window can be placed underneath the other, starting with the first window being placed underneath the desktop-icon-surface-containing WorkerW window. Once placed, the Zorder modifier flags can be reset or removed.

In some cases, at block 706, the desktop windows can be reordered, as necessary. Reordering the windows at block 706 can include identifying the desktop window(s), such as by performing an EnumWindows function to capture the list of all WorkerW-class windows starting with the desktop layer and beneath by ignoring all WorkerW windows until the desktop icon surface window is found, then identifying all remaining WorkerW windows. The desktop icon surface window can be identified as the WorkerW window containing a child window with class ShellDefView, which itself contains a child window of class SysListView32. The first of these identified windows, which would be the desktop icon surface window, can be moved underneath the invisible guide window (e.g., via a SetWindowPos function). In some cases, if a carve-out option is enabled, no further desktop windows need be moved. However, if a carve-out option is not enabled, each subsequent desktop window identified above can be moved (e.g., using a SetWindowPos function), underneath the window before it, thus recreating the desktop windows, in their original order, beneath the invisible guide window.

In some cases, if a carved-out option is enabled, the carve-out region can be removed at block 708. Removing the carve-out region can include clearing the Window HRGN of the WorkerW which owns the desktop icon surface (e.g., via a SetWindowRgn(NULL) function).

While process 700 is depicted with certain blocks in a certain order, in some cases, process 700 can be performed using fewer blocks, more blocks, or different blocks than those shown. Additionally, in some cases, certain blocks can be performed in different orders and/or certain sub-blocks can be adapted to operate in different parent blocks.

Figure 8:
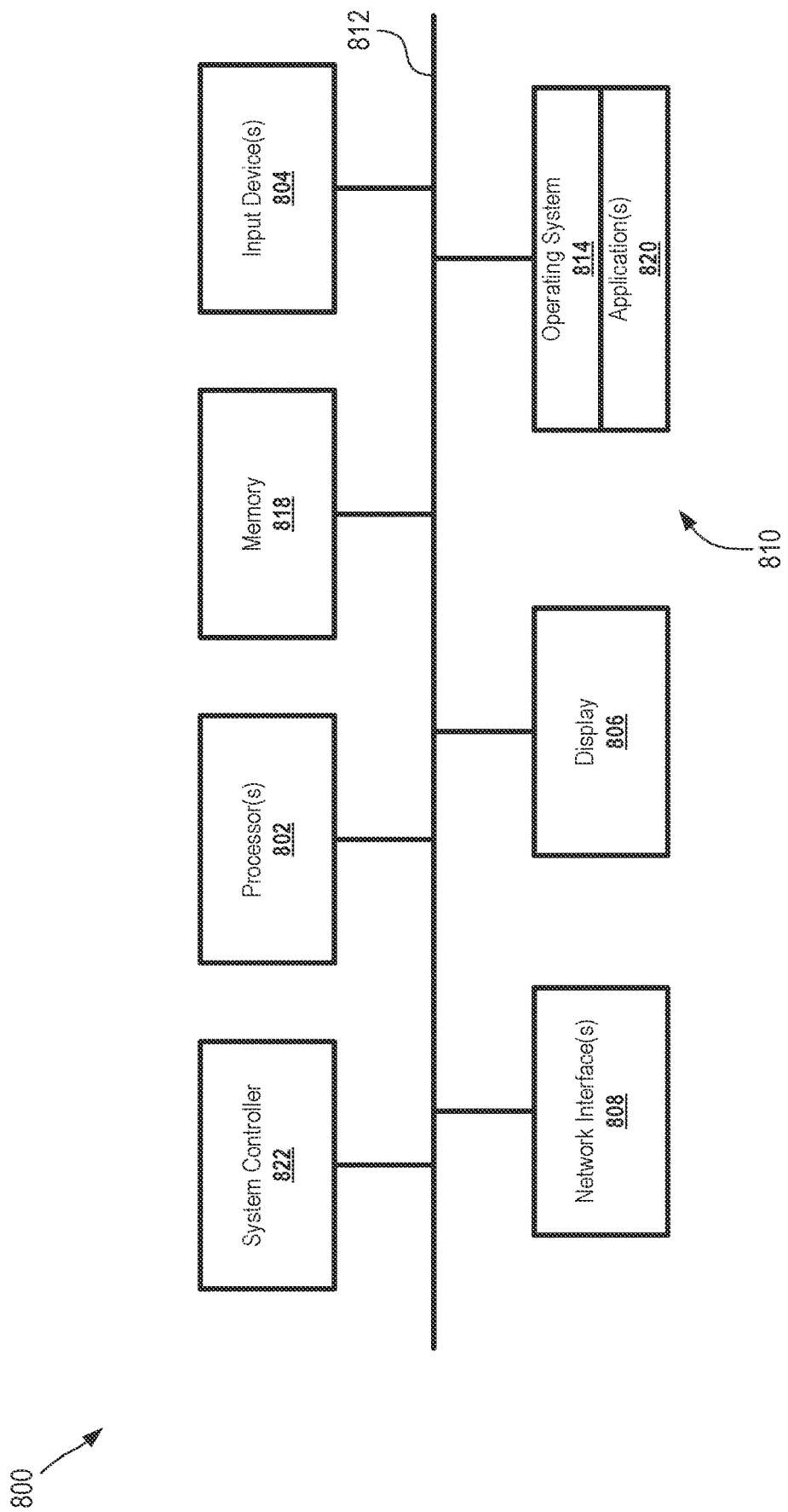
FIG. 8 is a block diagram of an example system architecture for implementing features and processes of the present disclosure.

FIG. 8 is a block diagram of an example system architecture 800 for implementing features and processes of the present disclosure, such as those described with reference to FIGS. 1-7. The system architecture 800 can be used to implement any suitable computing device (e.g., a server, workstation, tablet, or other such device) for practicing the various features and processes of the present disclosure. The system architecture 800 can be implemented on any electronic device that runs software applications derived from compiled instructions, including without limitation personal computers, servers, smart phones, electronic tablets, game consoles, email devices, and the like. In some implementations, the system architecture 800 can include one or more processors 802, one or more input devices 804, one or more display devices 806, one or more network interfaces 808, and one or more computer-readable mediums 810. Each of these components can be coupled by bus 812.

Display device 806 can be any known display technology, including but not limited to display devices using Liquid Crystal Display (LCD) or Light Emitting Diode (LED) technology. Processor(s) 802 can use any known processor technology, including but not limited to graphics processors and multi-core processors. Input device 804 can be any known input device technology, including but not limited to a keyboard (including a virtual keyboard), mouse, track ball, and touch-sensitive pad or display. Bus 812 can be any known internal or external bus technology, including but not limited to ISA, EISA, PCI, PCI Express, NuBus, USB, Serial ATA or FireWire.

Computer-readable medium 810 can be any medium that participates in providing instructions to processor(s) 802 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 810 can include various instructions for implementing operating system 814 and applications 820 such as computer programs. The operating system can be multi-user, multiprocessing, multitasking, multithreading, real-time and the like. The operating system 814 performs basic tasks, including but not limited to: recognizing input from input device 804; sending output to display device 806; keeping track of files and directories on computer-readable medium 810; controlling peripheral devices (e.g., disk drives, printers, etc.) which can be controlled directly or through an I/O controller; and managing traffic on bus 812. Computer-readable medium 810 can include various instructions for implementing firmware processes, such as a BIOS. Computer-readable medium 810 can include various instructions for implementing any of processes described herein, such as process 300, 400, 500, 600, or 700 of FIG. 3, 4, 5, 6, or 7, respectively.

Memory 818 can include high-speed random access memory and/or non-volatile memory, such as one or more magnetic disk storage devices, one or more optical storage devices, and/or flash memory (e.g., NAND, NOR). The memory 818 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 818 can store an operating system, such as Darwin, RTXC, LINUX, UNIX, OS X, WINDOWS, or an embedded operating system such as VxWorks.

System controller 822 can be a service processor that operates independently of processor 802. In some implementations, system controller 822 can be a baseboard management controller (BMC). For example, a BMC is a specialized service processor that monitors the physical state of a computer, network server, or other hardware device using sensors and communicating with the system administrator through an independent connection. The BMC is configured on the motherboard or main circuit board of the device to be monitored. The sensors of a BMC can measure internal physical variables such as temperature, humidity, power-supply voltage, fan speeds, communications parameters and operating system (OS) functions.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java, Python), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computing system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, and the like.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the disclosure. Thus, the breadth and scope of the present disclosure should not be limited by any of the above described embodiments.

Although certain aspects and features of the present disclosure have been illustrated and described with respect to one or more implementations, equivalent alterations and modifications will occur or be known to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only, and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

One or more elements or aspects or steps, or any portion(s) thereof, from one or more of any of claims 1 to 20 below can be combined with one or more elements or aspects or steps, or any portion(s) thereof, from one or more of any of the other claims 1 to 20 or combinations thereof, to form one or more additional implementations and/or claims of the present disclosure.

What is claimed is:

1. A computer-implemented method, comprising:
    presenting a desktop on an operating system, wherein the desktop includes one or more desktop windows, the desktop being presented at a desktop layer of a window stack, wherein the desktop includes a container set of one or more containers, each container of the container set containing at least one icon;
    presenting a working window, the working window having a higher z-order than the desktop layer;
    receiving an engagement signal to engage a peek functionality;
    moving the container set within the window stack to present the container set above the working window in the window stack in response to engagement of the peek functionality;
    receiving an interaction with the at least one icon while the container set is presented above the working window in the window stack;
    receiving a disengagement signal; and
    reverting the container set to the desktop layer of the window stack in response to receiving the disengagement signal.

2. The method of claim 1, wherein presenting the container set above the working window includes overlapping at least a portion of the working window with the container set, and wherein the working window is a WorkerW-class window.

3. The method of claim 1, wherein receiving the engagement signal includes:
    receiving keyboard input;
    determining that a hotkey configuration is depressed based on the keyboard input; and
    engaging a hotkey system in response to determining that the hotkey configuration is depressed, wherein engaging the hotkey system includes passing simulated keyboard input to indicate release of each key associated with the hotkey configuration.

4. The method of claim 3, further comprising:
    receiving additional keyboard input while the peek functionality is engaged;
    determining that the hotkey configuration remains depressed in response to receiving the additional keyboard input; and
    not passing the additional keyboard input.

5. The method of claim 3, wherein engaging the hotkey system includes storing an array of key state information, the array of key state information indicative that each key of the hotkey configuration is depressed, wherein the simulated keyboard input indicates that each key of the hotkey configuration is not depressed.

6. The method of claim 1, wherein receiving the disengagement signal includes:
    receiving further keyboard input while the peek functionality is engaged;
    determining that the hotkey configuration is no longer depressed in response to receiving the further keyboard input; and
    disengaging the hotkey system in response to determining that the hotkey configuration is no longer depressed.

7. The method of claim 1, wherein moving the container set to present the container set above the working window in the window stack comprises:
    subclassing the one or more desktop windows;
    setting a Z-order lock for each of the one or more desktop windows;
    creating an invisible guidance window;
    moving the guidance window to a top of the window stack; and
    moving the one or more desktop windows immediately below the guidance window.

8. The method of claim 7, wherein moving the container set to present the container set above the working window in the window stack further comprises:
    generating a carve-out region associated with the container set; and
    applying the carve-out region to the one or more desktop windows such that the one or more desktop windows are presented only within the carve-out region.

9. The method of claim 1, wherein the one or more desktop windows includes a desktop icon surface window.

10. The method of claim 1, wherein the desktop icon surface window includes the container set.

11. The method of claim 1, further comprising:
    determining that a session change has occurred, the session change including i) a lock change; ii) an unlock change; or iii) a session disconnect; and
    generating the disengagement signal in response to determining that the session change has occurred.

12. The method of claim 1, further comprising:
identifying, while the peek functionality is engaged, a new foreground window;
determining that the new foreground is not of a predetermined class of windows; and
generating the disengagement signal in response to determining that the new foreground is not of the predetermined class of windows.

13. The method of claim 12, wherein generating the disengagement signal includes generating the disengagement signal with a parameter to minimize other windows, and wherein receiving the disengagement signal includes comprises silently minimizing all minimizable windows below the one or more desktop windows except for the new foreground window.

14. A system, comprising:
one or more data processors; and
a non-transitory computer-readable storage medium containing instructions which, when executed on the one or more data processors, cause the one or more data processors to perform operations including:
presenting a desktop on an operating system, wherein the desktop includes one or more desktop windows, the desktop being presented at a desktop layer of a window stack, wherein the desktop includes a container set of one or more containers, each container of the container set containing at least one icon;
presenting a WorkerW-class window, the WorkerW-class window having a higher z-order than the desktop layer;
receiving an engagement signal to engage a peek functionality;
moving the container set within the window stack to present the container set in an unobscured manner above the WorkerW-class window in the window stack in response to engagement of the peek functionality;
receiving an interaction with the at least one icon while the container set is presented above the WorkerW-class window in the window stack;
receiving a disengagement signal; and
reverting the container set to the desktop layer of the window stack in response to receiving the disengagement signal.

15. The system of claim 14, wherein presenting the container set above the WorkerW-class window includes overlapping at least a portion of the WorkerW-class window with the container set.

16. The system of claim 14, wherein receiving the engagement signal includes:
receiving keyboard input;
determining that a hotkey configuration is depressed based on the keyboard input; and
engaging a hotkey system in response to determining that the hotkey configuration is depressed, wherein engaging the hotkey system includes passing simulated keyboard input to indicate release of each key associated with the hotkey configuration.

17. The system of claim 16, wherein the operations further comprise:
receiving additional keyboard input while the peek functionality is engaged;
determining that the hotkey configuration remains depressed in response to receiving the additional keyboard input; and
not passing the additional keyboard input on to the operating system.

18. The system of claim 16, wherein engaging the hotkey system includes storing an array of key state information, the array of key state information indicative that each key of the hotkey configuration is depressed, wherein the simulated keyboard input indicates that each key of the hotkey configuration is not depressed.

19. The system of claim 14, wherein receiving the disengagement signal includes:
receiving further keyboard input while the peek functionality is engaged;
determining that the hotkey configuration is no longer depressed in response to receiving the further keyboard input; and
disengaging the hotkey system at least in response to determining that the hotkey configuration is no longer depressed.

20. The system of claim 14, wherein moving the container set to present the container set above the WorkerW-class window in the window stack comprises:
subclassing the one or more desktop windows;
setting a Z-order lock for each of the one or more desktop windows;
creating an invisible guidance window;
moving the guidance window to a top of the window stack; and
moving the one or more desktop windows immediately below the guidance window.

21. The system of claim 20, wherein moving the container set to present the container set above the WorkerW-class window in the window stack further comprises:
generating a carve-out region associated with the container set; and
applying the carve-out region to the one or more desktop windows such that the one or more desktop windows are presented only within the carve-out region.

22. The system of claim 14, wherein the one or more desktop windows includes a desktop icon surface window.

23. The system of claim 14, wherein the desktop icon surface window includes the container set.

24. The system of claim 14, wherein the operations further comprise:
determining that a session change has occurred, the session change including i) a lock change; ii) an unlock change; or iii) a session disconnect; and
generating the disengagement signal in response to determining that the session change has occurred.

25. The system of claim 14, wherein the operations further comprise:
identifying, while the peek functionality is engaged, a new foreground window;
determining that the new foreground is not of a predetermined class of windows; and
generating the disengagement signal in response to determining that the new foreground is not of the predetermined class of windows.

26. The system of claim 25, wherein generating the disengagement signal includes generating the disengagement signal with a parameter to minimize other windows, and wherein receiving the disengagement signal includes comprises silently minimizing all minimizable windows below the one or more desktop windows except for the new foreground window.

* * * * *